(12) United States Patent
Yamada (10) Patent No.: US 6,349,824 B1
(45) Date of Patent: Feb. 26, 2002

(54) WATERTIGHT EQUIPMENT COVER

(75) Inventor: Masahiro Yamada, Yokohama (JP)

(73) Assignee: Asahi Research Corporation, Tokyo (JP)

( * ) Notice: Subject to any disclaimer, the term of this patent is extended or adjusted under 35 U.S.C. 154(b) by 0 days.

(21) Appl. No.: 09/455,567

(22) Filed: Dec. 6, 1999

Related U.S. Application Data (63) Continuation-in-part of application No. 09/105,556, filed on Jun. 26, 1998, now Pat. No. 5,996,790.

(51) Int. Cl.$^7$ .............................................. B65D 85/38
(52) U.S. Cl. ...................... 206/316.1; 206/811; 383/84; 383/907; 53/441; 150/165
(58) Field of Search ........................... 206/316.1, 316.2, 206/811, 320, 305; 150/154, 161, 162, 165; 383/84, 112, 907; 53/441

(56) References Cited

U.S. PATENT DOCUMENTS

| | | | | |
|---|---|---|---|---|
| 1,156,441 A | * | 10/1915 | Stearns | .................... 206/316.2 |
| 4,071,066 A | * | 1/1978 | Schaeffer | .................. 206/316.2 |
| 4,746,043 A | * | 5/1988 | Booker | ........................ 206/305 |
| 4,882,600 A | * | 11/1989 | Van De Moere | .............. 354/64 |
| 4,982,841 A | * | 1/1991 | Goedecke | ................. 206/316.2 |
| 5,025,921 A | * | 6/1991 | Gasparaitis et al. | ......... 206/320 |
| 5,092,458 A | * | 3/1992 | Yokoyama | ................ 206/316.2 |
| 5,669,020 A | * | 9/1997 | Hopmeyer | ................ 206/316.2 |
| 6,082,535 A | * | 7/2000 | Mitchell | ...................... 206/320 |

* cited by examiner

*Primary Examiner*—Paul T. Sewell
*Assistant Examiner*—Jila M. Mohandesi
(74) *Attorney, Agent, or Firm*—Mayer, Brown & Platt (57) ABSTRACT

A watertight equipment cover for protecting equipment comprising first and second housing portions with sealing mechanisms attached thereto. The sealing mechanisms of the first and second housing portions are sealably engageable with each other to provide a watertight seal therebetween. Further, the first and second housings are designed to conform substantially to the contours of the protected equipment. The watertight equipment cover may also include a rotatable mechanism or blister for engaging and rotating a rotatable structure on the protected equipment.

19 Claims, 6 Drawing Sheets

WATERTIGHT EQUIPMENT COVER

This is a continuation-in-part application of U.S. application Ser. No. 09/105,556, filed Jun. 26, 1998 now U.S. Pat. No. 5,996,790.

FIELD OF THE INVENTION

The present invention relates to a cover for enclosing equipment in a watertight fashion while permitting operation of the equipment. Particularly, the present invention is directed to a cover that enables the enclosed equipment to be easily transported and operated, and that includes an entry that is both watertight and easy to seal and reseal.

BACKGROUND OF THE INVENTION

Weatherproof equipment cases are well known and have been available for a number of years. These equipment cases have been widely used in commercial applications such as cinematography, and professional photography, as well as in recreational applications.

U.S. Pat. No. 4,033,392 discloses an embodiment of a known weatherproof camera case. In this embodiment, the camera case includes a sealable opening through which the camera may be inserted for enclosure in the case. The case further includes a second opening in the camera case positioned such that when a camera is enclosed, the second opening is adjacent the area on the body of the camera that receives a lens. When the camera body is enclosed within the case, the camera lens extends into the second opening and may be attached to both the camera body and second opening such that the lens extends exteriorly of the case and is exposed to the environment.

U.S. Pat. No. 4,982,841 discloses a protective envelope for a video camera. The protective envelope is loosely constructed to partially conform to various camera shapes, and includes a front window through which the camera lens can receive images for filming. Disposed inside of the protective envelope, below the front window, is a supporting device and spacer to which a camera may be mounted. The protective envelope when draped over a camera provides space between portions of the camera body and the front window. The supporting device and spacer are used to adjust the distance between the front window and the camera auto focus system.

U.S. Pat. No. 3,036,506 discloses a camera for underwater photography. In this embodiment, the case loosely surrounds the camera. The case is flexible to permit manual manipulation of camera elements while a camera is enclosed in the case. The case, however, is amply sized to accommodate one or more cameras and therefore can impede operation of the enclosed camera and increases the likelihood of severe mishandling such as dropping. A transparent window is fastened in a leak-proof manner to one end of the case. The opposite end of the case is open so that the camera may be inserted and removed therefrom. The open end may be sealed with a clamp to protect against water leakage.

U.S. Pat. Nos. 5,285,894, 5,325,139 and 4,882,600 each disclose camera cases for underwater picture taking. However, each of these patents is directed to camera cases that are not resealable by the end-user for repeated use after all of the enclosed camera's film has been exposed.

In view of the above, there remains a need for a water-impermeable equipment case that completely encloses a piece of equipment, that permits operation of the enclosed equipment's operable features, that substantially conforms to the shape of the equipment, so that the cover does not gather, bunch, or otherwise substantially impede the operation and handling of the enclosed equipment, and that is sealable and resealable by the end-user.

SUMMARY OF THE INVENTION

The purpose and advantages of the invention will be set forth in and apparent from the description and drawings that follow below, as well as will be learned by practice of the invention. Additional advantages of the invention will be realized and attained by the elements of the apparatus particularly pointed out in the appended claims.

To achieve these and other advantages and in accordance with the purpose of the invention, as embodied and broadly described herein, a watertight equipment cover is provided for enclosing a piece of equipment while permitting operation of the enclosed equipment. Particularly, the present invention includes a housing that substantially corresponds to the shape and configuration of the equipment and that includes a resealable entry for inserting and removing the equipment. In this manner, the equipment cover of the present invention provides a protective cover for outdoor and marine use of electronic apparatuses, such as portable telephones, mobile computers, and photographic equipment.

In the present invention, the housing includes an inner surface and an outer surface. The inner surface defines an interior chamber for receiving the equipment, and is configured to substantially correspond to the shape of the equipment such that when the equipment is enclosed in the housing, the interior surface of the housing is substantially adjacent to the exterior surface of the equipment.

For simplicity of explanation, the discussion of a preferred embodiment is primarily directed to an equipment cover for a camera and portable telephone. In a preferred embodiment, the housing consists of a front and a back piece. The front piece includes a front face and four side walls. The back piece includes a back face and four side walls. The front and back pieces join together at the corresponding side walls such that the inner surfaces of the front and back faces, and the eight side walls define the interior chamber. Preferably, the housing is constructed generally of a flexible, waterproof polymer such as transparent polyurethane.

The housing of the present invention further includes resiliently deformable portions formed in one or more walls. The resiliently deformable portions are located at positions in the one or more walls such that when the equipment is enclosed within the housing, the resiliently deformable portions are located substantially adjacent to and allow operation of the operable features of the equipment. The operable features are those control features located in the surface of the equipment that must be manipulated by an operator to operate the equipment. Where necessary, to aid the operator in using the equipment, the resiliently deformable portions may have indications, such as letters or numbers corresponding to an enclosed keypad, imprinted or overlaid thereon using conventional or other appropriate techniques. Alternatively, the resiliently deformable portions may be transparent or semi-transparent if the corresponding operable features of the equipment must be seen by the operator.

For example, in the case of a camera, the operable features are those control features located in the camera exterior that are needed to take photographs. In a preferred embodiment, when a camera is enclosed in the case, the resiliently deformable portions are located substantially adjacent the camera shutter control button and the camera flash control switch. The resiliently deformable portions also may be positioned substantially adjacent the camera film advance wheel, film rewind button or the like.

The housing of a preferred embodiment of the present invention further includes transparent portions. The transparent portions are positioned in one or more housing walls substantially adjacent to the viewer areas of the equipment that either must be seen by an operator or must transmit or receive light through the housing to operate properly. In the case of a camera, the transparent portions are positioned such that when a camera is enclosed in the housing, the light-receiving, picture-taking features in the camera's exterior surface, such as the camera lens, may operate in a substantially unhindered fashion. Preferably, the housing for a camera includes at least three transparent portions. Two transparent portions are located in the front face of the housing and one transparent portion is located in the back face of the housing. The transparent portions are configured and positioned so that when a camera is enclosed: one of the transparent portions in the front face is substantially adjacent to and allows substantially unhindered operation of the camera lens, the other transparent portion in the front face is substantially adjacent to and allows substantially unhindered operation of the camera flash, and the transparent portion in the back face is substantially adjacent to and allows substantially unhindered operation of the camera viewfinder.

For a portable telephone or mobile computer, at least one transparent portion is configured and positioned to correspond to an enclosed view screen. Preferably, additional transparent portions are configured and positioned to be substantially adjacent to the equipment's viewer areas, such as a keypad or keyboard, that the operator must see to operate. In this manner, some of the operable features and some of the viewer areas of the equipment may be one and the same, and correspondingly, the resiliently deformable portions and the transparent portions may comprise some of the same portions of the housing.

The housing of the present invention further includes a housing entry. The housing entry includes a resealable, watertight sealing mechanism. The sealing mechanism is operable between open and closed positions. When the sealing mechanism is in the open position, the interior chamber may be exposed to receive the equipment.

In the camera cover of a preferred embodiment, the sealing mechanism, preferably a zipper, is disposed along the housing entry, so that (1) when the sealing mechanism is in the closed position, the housing is sealed in a watertight manner; and (2) when the sealing mechanism is in the open position, the housing may be opened such that the front face and back face lay in the same plane. However, as described in more detail below, a wide variety of sealing mechanisms may be used to seal the watertight equipment cover of the present invention.

The housing entry of a preferred embodiment includes two sealing flaps, each disposed along an opposite edge of the housing entry. The sealing flaps are located in close proximity to and interiorly of the sealing mechanism. The sealing flaps are positioned so that when the sealing mechanism is in the closed position, the edges of one sealing flap engage the laterally opposite edges of the other sealing flap. In this manner, both the sealing mechanism and the engaged sealing flaps create a barrier to water penetration.

It is to be understood that both the foregoing general description and the following detailed description are exemplary and are provided for purposes of explanation only, and are not restrictive of the invention as claimed.

BRIEF DESCRIPTION OF THE DRAWINGS

The accompanying drawings, which are incorporated in and constitute a part of this specification, illustrate the preferred embodiment of the invention, and together with the description, serve to explain the principles of the invention.

DETAILED DESCRIPTION OF THE PREFERRED EMBODIMENT

In accordance with the present invention, a watertight equipment cover is provided for enclosing equipment, such as a camera, portable telephone, or mobile computer, while permitting operation of the enclosed equipment. In particular, the cover is configured to substantially conform to the shape of either a particular make and model or a particular class of equipment. Thus, the cover is either custom-made or semi-custom made for the equipment that is to be enclosed. In this manner, the cover and enclosed equipment easily may be manipulated with reduced risk of mishandling such as by dropping, and with reduced risk of the cover distorting any photographs or other images produced by the enclosed equipment. Further, the present invention includes a resealable opening, in the form of a sealing mechanism, that enables the end user to insert the equipment into or remove the equipment from the cover.

Figure 1:
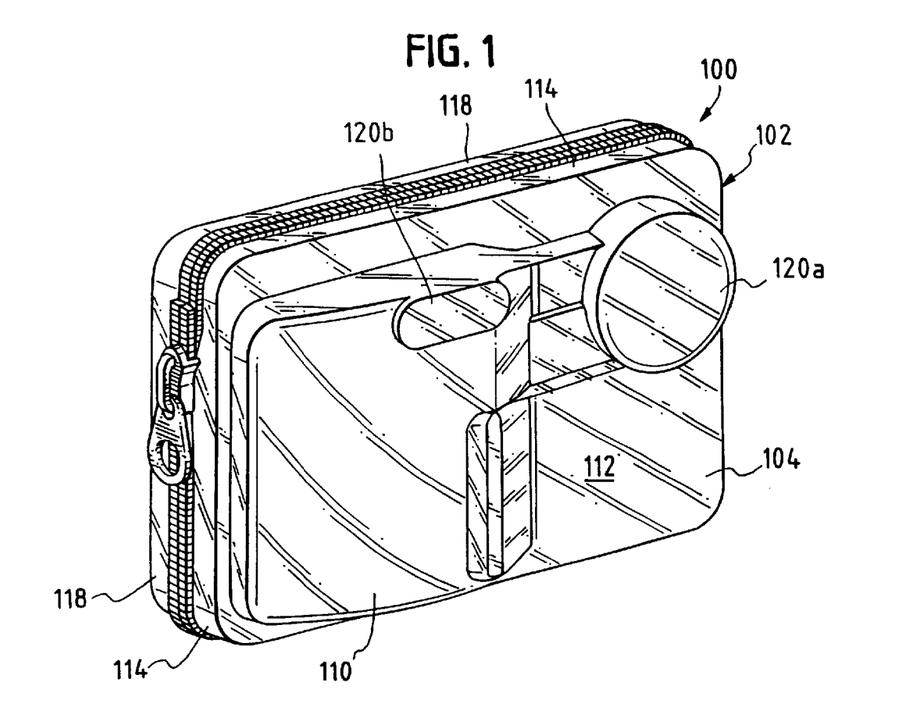
FIG. 1 is a front perspective view of a representative embodiment of the cover of the present invention in the closed position.
Figure 2:
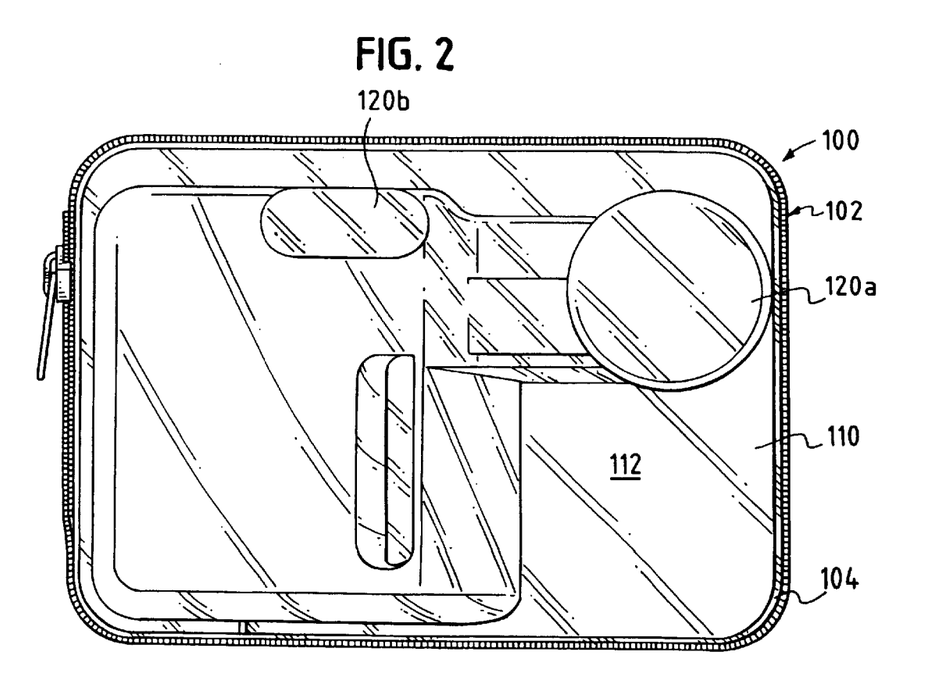
FIG. 2 is a front elevation view of the cover shown in FIG. 1.

For simplicity of explanation, the description of a preferred embodiment, and alternatives thereto will be made with primary reference to an equipment cover for a camera and a portable telephone. It should be understood, however, that the same principles described herein apply to equipment covers for any other equipment where it is desirable to protect the equipment from water or other intrusions. For purposes of illustration, not limitation, FIG. 1 shows a representative embodiment of the watertight equipment cover 100 for a camera. The cover includes generally a housing 102, a housing entry 200 and a sealing mechanism 202.

Figure 3:
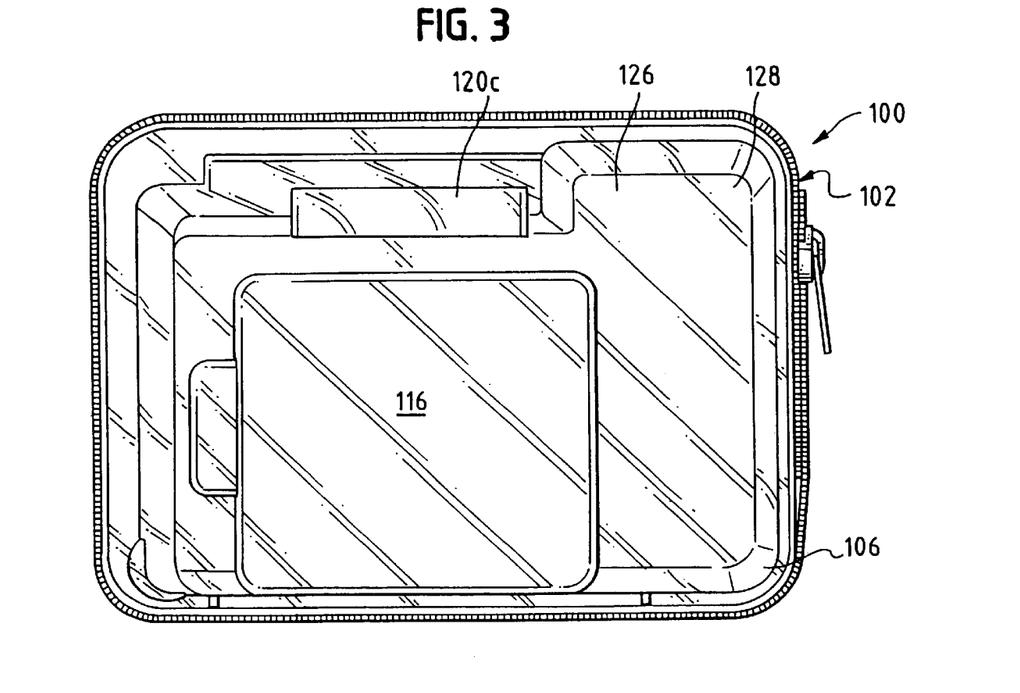
FIG. 3 is a rear elevation view of the cover shown in FIG. 1.
Figure 4:
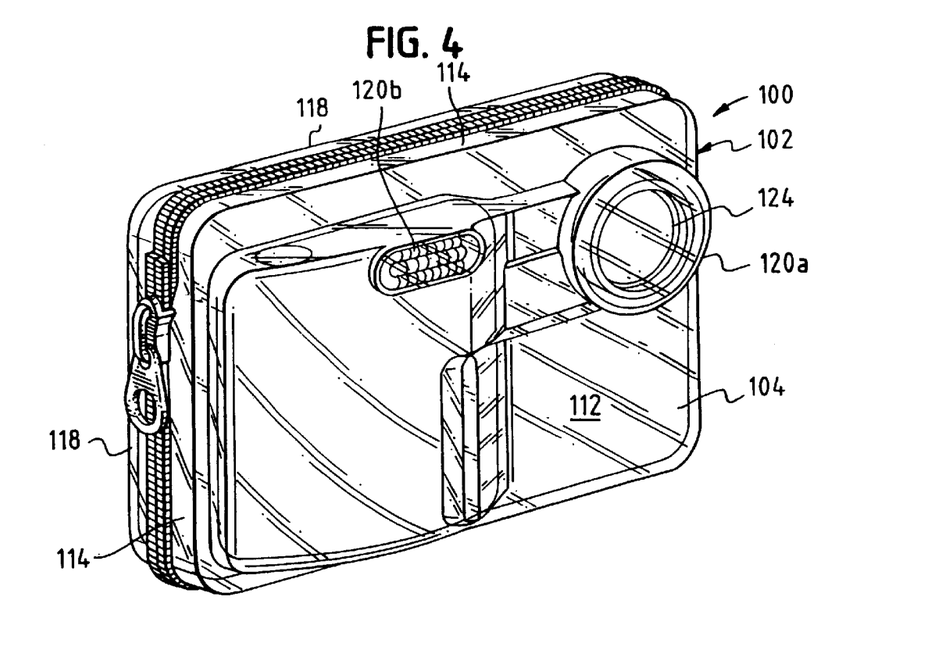
FIG. 4 is a front perspective view of the cover shown in FIG. 1 with a camera enclosed.

The housing 102 includes a front piece 104 and a back piece 106 (shown in FIG. 3) which together comprise an inner surface 108 (best shown in FIG. 5) and a corresponding outer surface 110. The front piece 104 includes a front face 112 and four sides 114. Similarly, the back piece 106 includes a back face 116 and four sides 118. The front piece 104 and back piece 106 are configured so that when the cover 100 is in the closed position, as shown in FIGS. 1–3, the front piece 104 and back piece 106 define an interior chamber 119 which substantially conforms to the shape of a particular camera make and model. Alternatively, the front piece 104 and back piece 106 may be configured so that the interior chamber 119 substantially conforms to the shape of a particular class of cameras. FIG. 4 illustrates the cover of the present invention in a closed position with a camera 121 contained within inner chamber 119. The equipment cover 100 substantially conforms to the shape of the camera 121.

In the preferred embodiment, the front piece 104 and back piece 106 are integrally formed and continuous along one interface between sides 114 and 118. This interface is illustrated at 210 in FIG. 5. It should be understood that the greater proportion of the interface between front piece 104 and back piece 106 that is continuously formed, the greater waterproofing characteristics the cover provides. It should also be understood that the amount of the interface continuously formed must be balanced against the ability to place the camera into the inner chamber with as little interference as possible. It has been found that a single interface between sides 114 and 118 provides both adequate waterproofing characteristics and ease of inserting or removing the camera into or from the cover, however, more or less interface between the front piece 104 and back piece 106 is operationally acceptable.

Preferably, the housing 102 is constructed of waterproof, flexible, transparent elastomer such as polyurethane. Although flexible, the equipment cover of the preferred embodiment maintains its shape, which substantially conforms to the shape of the camera, whether or not the camera is enclosed. As an alternative to elastomer, the housing may be constructed of a water-resistant material such as natural rubber, or any other flexible waterproof material suitable for the purposes of this invention. As an alternative to a transparent housing, the housing may be semi-transparent or opaque. The housing 102 may be constructed using conventional, or other suitable, techniques such as injection molding.

In the preferred embodiment, the housing includes transparent portions. The transparent portions are positioned in the housing to be substantially adjacent to the viewer areas of the equipment. The viewer areas are those areas of the enclosed equipment that either must be seen by the operator or must transmit or receive light through the housing. As best shown in FIGS. 3 and 4 of the preferred embodiment, the transparent portions 120 are substantially adjacent to the light-receiving, picture-taking features located in the exterior surface of the enclosed camera. The transparent portions 120 are configured to allow substantially unhindered picture taking while the camera is enclosed in the cover 100. The transparent portions 120a and 120b are located in the front face 112 of the front piece 104. The transparent portion 120c is located in the back face 116 of the back piece 106. When the cover 100 is in the closed position, and as best shown in FIGS. 3 and 4, transparent portion 120a is substantially adjacent to an enclosed camera lens 124, transparent portion 120b is substantially adjacent an enclosed camera flash, and transparent portion 120c is substantially adjacent to an enclosed camera viewfinder. Preferably, the transparent portions 120 are integral to the housing 102 and are constructed of transparent polyurethane. Alternatively, the transparent portions 120 may be constructed of another suitable, transparent material such as glass, acrylic or polycarbonate. When the transparent portions are not integral to the housing 102, the transparent portions may be attached to the housing 102 using suitable watertight means, such as a conventional frame and gasket. Preferably, the edge of the housing to which the transparent portion and corresponding frame are attached serves the function of the aforementioned gasket.

The present invention further includes resiliently deformable portions. The resiliently deformable portions are positioned in the housing to be substantially adjacent the enclosed camera's operable features that are required for taking photographs. The resiliently deformable portions are sufficiently deformable to allow the camera operator to operate the camera control features while the camera is enclosed in the cover.

In the preferred embodiment, the resiliently deformable portions are constructed of the same material and are the same thickness as the housing. If the housing is constructed of plastic resin, the preferred thickness for photographic equipment is between ⅛ and ¼ inch and the preferred thickness for electronic equipment with keypads or other operable features with closely spaced components is between 1/16 and ⅛ inch. Alternatively, the thickness and material of construction of the resiliently deformable portions each may vary, depending on the design objectives, such as the desired degree of transparency, durability, or deformability. For example, where additional ease of deformation is required, the thickness of the resiliently deformable portions may vary depending on the material used to construct the resiliently deformable portions. If additional elasticity is required to operate a particular operable feature, such as switch or dial operated features, then the resiliently deformable portions may be constructed to increase the operating range, such as achieved by a conventional bellows construction. Such design variations in material thickness and operating range are well known in the art.

As shown in FIG. 3, in the preferred embodiment, two resiliently deformable portions 126 and 128 are located in the back face 116 of the back piece 108. When a camera is enclosed in the cover 100, the resiliently deformable portion 126 is located substantially adjacent to and allows operation of the camera shutter control button for taking pictures, and the resiliently deformable portion 128 is located substantially adjacent to and allows operation of the camera flash control switch. In the preferred embodiment, the resiliently deformable portions 126, 128 are integral to the housing 102 and constructed of polyurethane. Alternatively, the resiliently deformable portions may be constructed of another suitable, water-resistant material. Resiliently deformable portions may be positioned and oriented adjacent to any part of the camera that requires manipulation by the operator. If the resiliently deformable portions are not integral to the housing, then they may be attached to the housing in a suitable watertight manner such as with a conventional frame and gasket.

Figure 5:
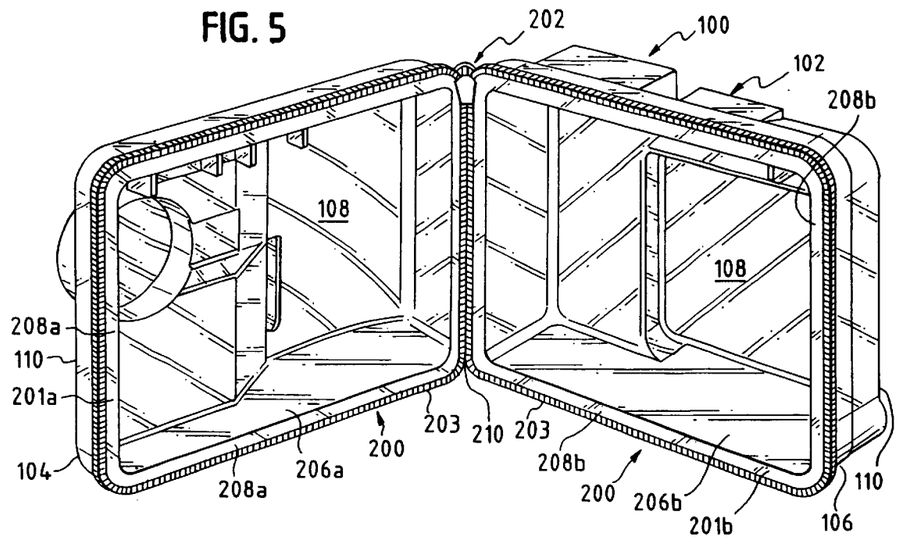
FIG. 5 is a front perspective view of a representative embodiment of the cover of the present invention in the open position.
Figure 6:
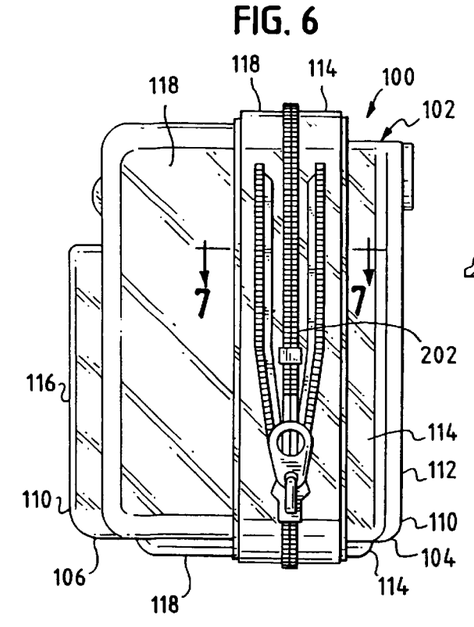
FIG. 6 is a side elevation view of the cover shown in FIG. 1.

The housing of the present invention further includes a housing entry for inserting the equipment into and removing the equipment from the cover 100. In the preferred embodiment, the housing 102 includes a single housing entry 200 comprising two edges 201. As shown in FIG. 5, the housing entry 200 is disposed along the sides 114 and 116 of the front piece 104 and back piece 106, respectively.

The housing of the preferred embodiment includes a sealing mechanism which allows the end-user to seal and reseal the housing as desired. The sealing mechanism 202 includes laterally opposite inter-engaging portions 203 disposed along the edges 201 of the housing entry 200. The sealing mechanism 202 is operable between open, closed, and intermediate positions. When the sealing mechanism 202 is in the fully closed position, as shown in FIG. 1, the interengaging portions 203 are engaged and the cover 100 is sealed in a watertight manner. When the sealing mechanism 202 is in the open position, as shown in FIG. 5, the interengaging portions 203 are disengaged and the housing entry 200 defines a housing opening. Preferably, the sealing mechanism 202 is a zipper and the interengaging portions 203 are zipper teeth. However, suitable alternative mechanisms may be used such as, for example, interengaging self-locking sealing lips of the type commonly found on resealable plastic containers. The sealing mechanism 202 may be attached to the housing 200 in a conventional, or other suitable, watertight manner such as with water-resistant adhesive bonding.

Figure 7:
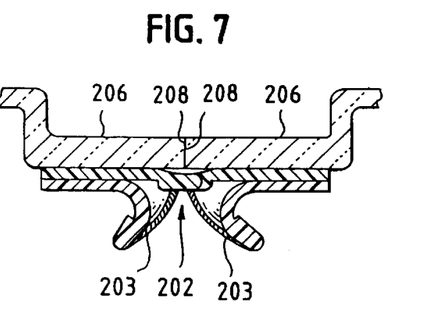
FIG. 7 is a cross-sectional view of a representative embodiment of the sealing mechanism and sealing flaps.

As shown in FIG. 5, the housing entry of the preferred embodiment further includes two sealing flaps 206 integral to the housing 102. Alternatively, only one sealing flap may be provided. One sealing flap 206a is disposed along one edge 201a and the other sealing flap 206b is disposed along the second edge 201b. Each sealing flap 206 is located in close proximity to and interiorly of the sealing mechanism 202. Each sealing flap 206 includes a sealing flap edge 208. The sealing flaps 206 and the sealing mechanism 202 are attached such that (as best shown in FIG. 7) as the laterally opposite interengaging portions 203 of the sealing mechanism 202 engage, the sealing flap edges 208a of one sealing flap 206a engage the laterally opposite sealing flap edges 208b of the second sealing flap 206b. In this manner, the housing entry 200 includes two barriers to water penetration.

Figure 8:
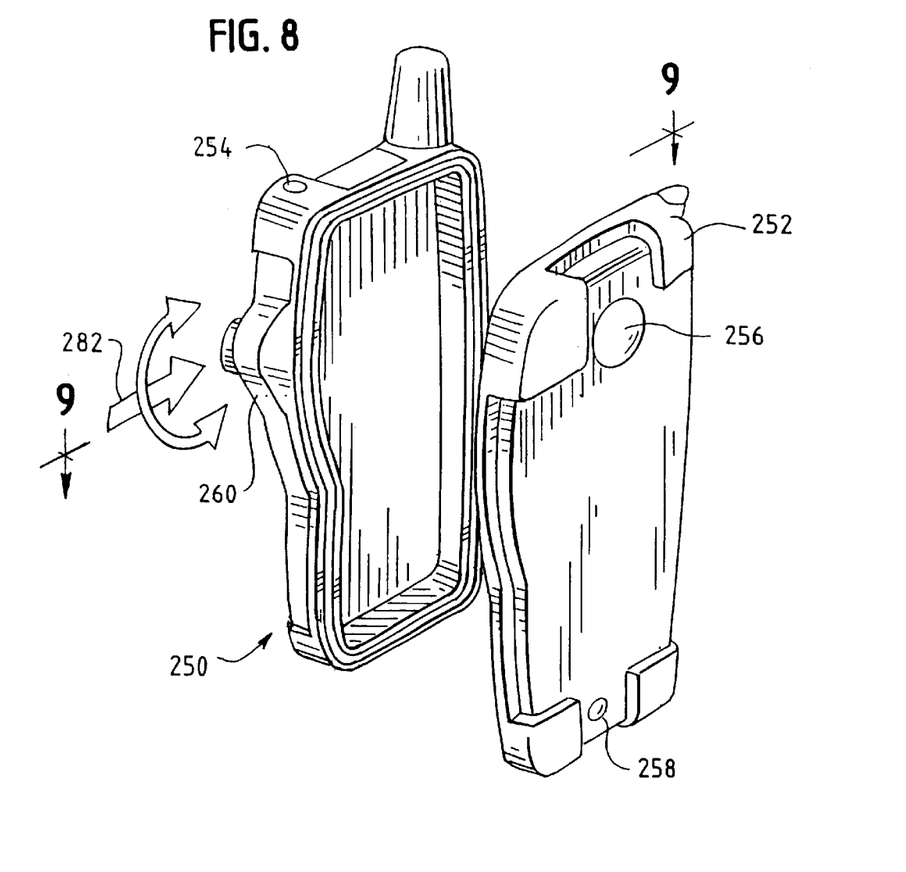
FIG. 8 is a exploded view of an alternative embodiment of the present invention.
Figure 9:
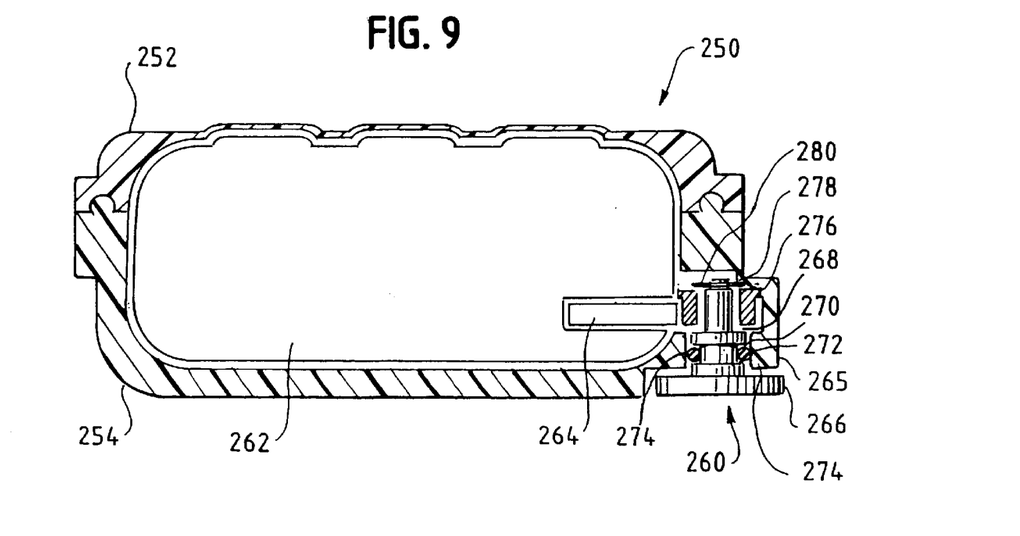
FIG. 9 is cross-sectional view taken along line 9—9 of FIG. 8 in an assembled position with a portable telephone enclosed therein.

Another embodiment of the present invention is shown in FIGS. 8–9. In particular, FIG. 8 shows a watertight equipment cover 250 for a portable telephone. As in the case of the watertight equipment cover 100, the watertight equipment cover 250 can be used for a variety of electronic equipment such as portable telephones, radios, cd players, beepers, and virtually any other electronic product. In the specific embodiment shown, however, the watertight housing 250 is constructed for use with a portable telephone.

The watertight equipment cover 250 comprises a front housing 252 and a rear housing 254. The front and rear housings 252 and 254 are preferably constructed from a pliable elastomer, such as polyurethane, made through an ejection molding process. The properties of the pliable elastomer allows the housing to be resiliently deformable, and therefore allows a user to actuate surface interfaces, such as push buttons, on the device contained within the watertight equipment cover 250. As an alternative to elastomers, the housing may be constructed of a water-resistant material such as natural rubber, or any other flexible waterproof material suitable for the purposes of this invention. As one skilled in the art will appreciate, although housings 252 and 254 are shown as two distinct structures, the cover 250 may comprise front and rear housings that are integrally joined or hinged along one or more edges.

Figure 12:
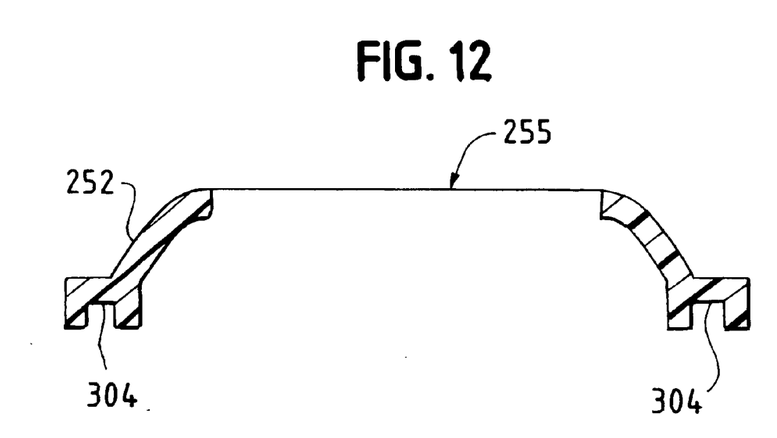
FIG. 12 is a cross-sectional view of an top portion of an additional embodiment of the present invention.

It should be understood that instead of having an integrally molded front and/or rear housing, a thin elastic film 255, as shown in FIG. 12, may be applied to the front and rear housings where any user interface is required. Such a thin elastic film 255 can provide greater tactile sensation for a user who wishes to actuate operable feature on the equipment enclosed in the cover 250. Further, the thin elastic film 255 allows a user to operate small operable features on the equipment that may not be operable with a molded housing. The elastic film 255 may be chemically or mechanically adhered to the remainder of the front and/or rear housing.

Because an electronic device such as a telephone contains speakers and microphones, regions 256 and 258 are provided on the front housing 250, as shown in FIG. 8, to allow for sufficient transmission of audio waves therethrough. In particular, regions 256 and 258 have a smaller thickness than the rest of the front housing 252. In a preferred embodiment, regions 256 and 258 are concave in shape, but may take any form that allows for sufficient transmission of audio waves.

FIG. 9 shows a cross sectional view of the watertight equipment cover 250 with an electronic device 262 enclosed therein. As can be seen in FIGS. 8 and 9, the watertight housing 250 also includes a jog dial assembly 260, which allows for operation of a rotatable structure 264 on the electronic device 262. The jog dial assembly 260 is substantially enclosed by jog dial housing 265, which is preferably made of the same soft, flexible elastomer as the watertight equipment cover. Jog dial assembly 260 includes a dial 266, which is attached to a shaft 268. The shaft 268 includes a first annular recess 270, in which an O-ring 272 is seated. O-ring 272 engages with annular bearing seat 274 to provide a dynamic seal, thus preventing water intrusion into the watertight equipment cover through the bearing seat 274 even when shaft 268 is rotated.

The shaft 268 also includes an annular roller interface 276, which is attached to shaft 268 for conjoint rotation therewith, and is designed to tangentially engage the rotatable structure 264. Preferably, roller interface 276 is attached to shaft 268 by a friction or interference fit. It should be understood, however, that other methods of attaching the roller interface 276 to the shaft 268 are acceptable, such as set screws or internal and external splines, knurls, or teeth in shaft 268, which mate with corresponding structures on said roller interface 276. Preferably, the roller interface 276 is made from a soft elastomer, such as polyurethane, thus providing it with a sufficient ductility and coefficient of friction to properly engage the rotatable structure 264 without any slippage between the roller interface 274 and the rotatable structure 264. Alternatively, however, it should be understood that the roller interface may be made of a hard plastic, which may include gear teeth on an outer periphery thereof to mechanically engage the rotatable structure 264.

The shaft 268 also includes a second annular recess 278, which is engageable with a e-ring retainer clip 280 or other suitable retaining means as are well known in the art. When retainer clip 280 is engaged with annular recess 278, shaft 268 is substantially prevented from moving axially with respect to the roller interface 276. Further, because roller interface 276 has a larger diameter than the bearing seat 274, the roller interface 276 and the shaft 268 are prevented from being removed from the jog dial housing 265.

Another advantage of the jog dial assembly 260 is that a user may push the entire jog dial assembly 260 in a direction substantially perpendicular to the axis of rotation of the shaft 268 and towards the electronic device, as shown by arrow 282 (FIG. 8). This is possible due to the fact that the jog dial assembly 260 is seated within the flexible constrains of the jog dial housing 265. This is particularly useful if the rotatable structure 264 also includes a switch (not shown) that is actuated by a pushing operation. Thus, in the case of a portable telephone, the turning of the rotatable structure may allow a user to scroll through stored phone numbers, and the pushing of the rotatable structure may initiate a call to the selected number.

Figures 9A, 10A:
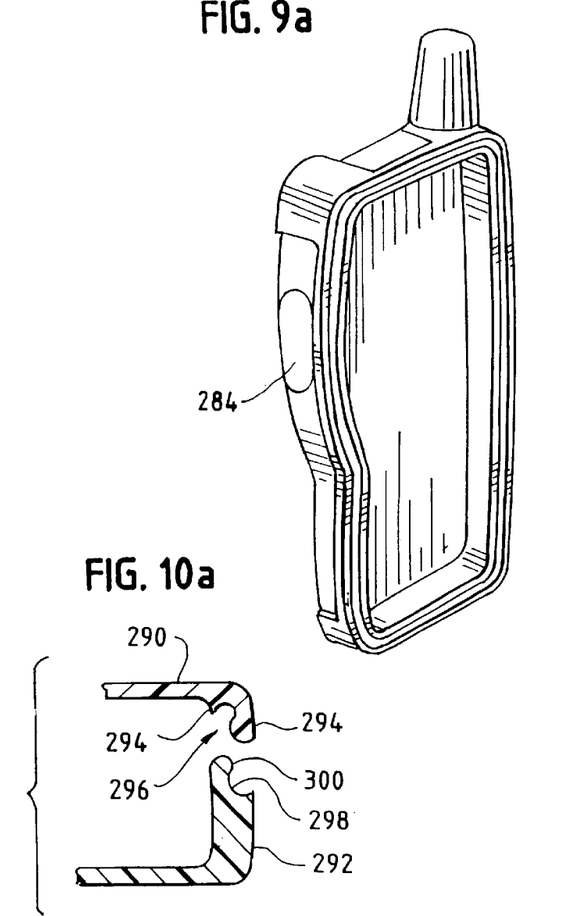
FIG. 9a is another alternative embodiment of the present invention.
FIG. 10a is a partial, cross-sectional view of a alternative sealing mechanism of the present invention.

Instead of using the jog dial assembly 260 to actuate the various functions of the rotatable structure 264, a flexible blister 284 may be used, as shown in FIG. 9a. Although flexible blister 284 is shown as substantially a bubble structure, it will be understood that the blister 284 may take the form of any other structure that bulges out from the cover housing, such as a bellow-type structure. Preferably, blister 284 comprises an elastomer such as polyurethane, and may include a reinforcing layer, such as a woven or knitted material. Alternatively, blister 284 can comprise any other material or materials that are capable of permitting a user to turn the rotatable structure 264 while not ripping or tearing the blister 284 in the process. Further, the blister is preferably manufactured separately from the rear housing 254, and then is subsequently attached utilizing a mechanical or chemical joining process (such as, for example, heat sealing or by use of an adhesive).

In order to seal the front housing 252 to the back housing 254, the watertight equipment cover 250 may include a zipper sealing mechanism as shown and described above. Additionally the sealing mechanism may take the form of the sealing structures shown in FIGS. 10–11. In particular, FIG. 10a shows a cross sectional view of interengageing sealing lips 290 and 292. Preferably, sealing lip 290 is made of a soft elastomer, such as polyethylene, and sealing lip 292 is made of a elastomer that is harder than the elastomer of sealing lip 290, such as polypropylene. Alternatively, sealing lip 292 may comprise a hard plastic. However, it should be understood that both sealing lips may be made of the same elastomer, or any other suitable material that will provide sufficient sealing characteristics for watertight operation.

Figure 10B:
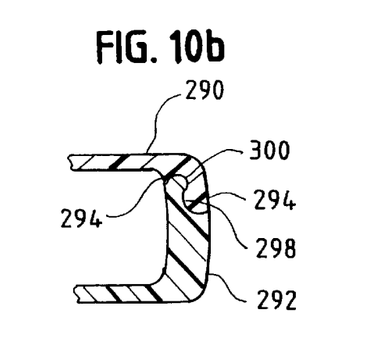
FIG. 10b is a partial, cross-sectional view of the sealing mechanism of FIG. 10a in a sealed position.

Sealing lip 290 includes sealing flaps 294 and recess 296, which is removably engageable with protruding member 298 of sealing lip 292. Protruding member 298 includes a bulb portion 300. As can be appreciated by viewing FIGS. 10a–10b, when recess 296 is not engaged with protruding member 298, recess 296 is dimensionally narrower than bulb portion 300. However, when sealing lips 290 and 292 are urged together by a user, sealing flaps 294 allow recess 296 to elastically expand, therefore allowing bulb portion 300 to enter recess 296. After bulb portion 300 is fully inserted into recess 298, sealing flaps 294 and 296 substantially return to their original position, thus creating a watertight pressure seal between sealing lips 290 and 292, as seen in FIG. 10b.

Figure 11A:
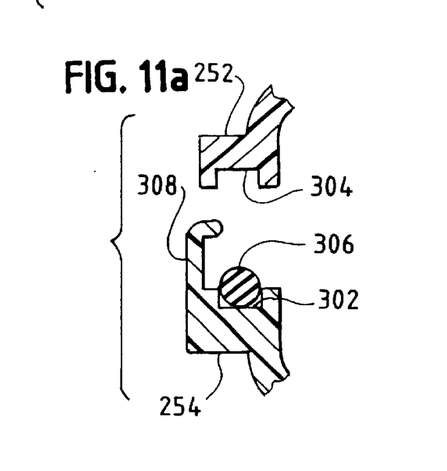
FIG. 11a is a cross-sectional view of yet another sealing mechanism of the present invention.
Figure 11B:
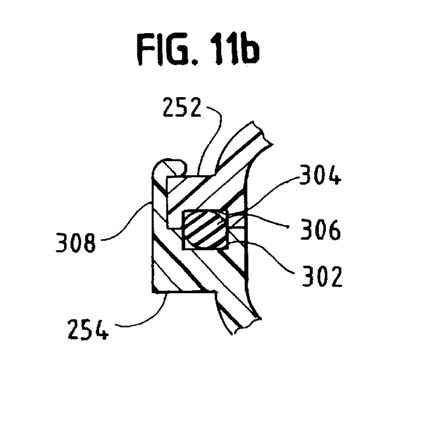
FIG. 11b is a cross-sectional view of the sealing mechanism of FIG. 11a in a sealed position.

Alternatively, the seal between the front housing 252 and rear housing 254 can be created by an O-ring seal. As seen in FIGS. 11a and 11b, the front and rear housings contain grooves 302 and 304 into which an O-ring 306 can be sealably inserted. Thus, when front housing 252 and rear housing 254 are pressed together by a user, O-ring 306 and grooves 302 and 304 sealably engage to provide a watertight seal. Additionally, a locking member 308 may be included along the periphery of the rear housing to ensure that front and rear housings 252 and 254 do not separate during use. In a preferred embodiment locking member 308 is integrally molded with the rear housing 254 and allows for elastic deformation to accommodate the opening and closing of the watertight equipment cover 250.

Figure 11C:
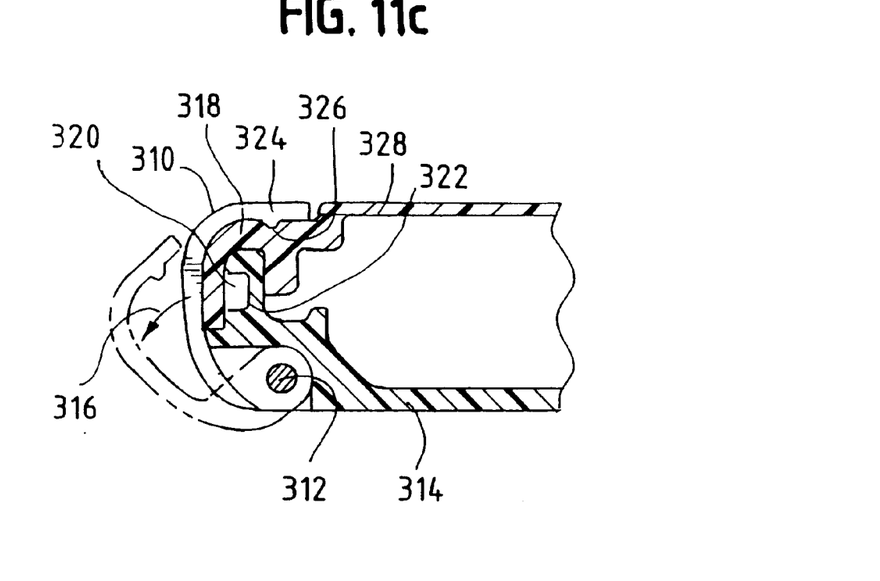
FIG. 11c is a cross-sectional view of another sealing mechanism of the present invention.

It should be understood that locking member 308 may take the form of a hinged locking member 310, as shown in FIG. 11c. Locking member 310 includes hinge 312 attached to rear housing 314, about which locking member 310 may pivot to the position indicated by arrow 316. However, it will be understood that the locking member 310 and hinge 312 may alternatively be attached to front housing 318. Rear housing 314 includes an o-ring 320 seated within a recess 322, wherein the o-ring engages the front housing 318 to provide a watertight seal. It is preferred that locking member 310 include a longitudinally extending spline 324 that removably engages with a longitudinally extending recess 326, thereby securing locking member 310 to front housing 318, which in turn holds front housing 318 in a sealed relationship with rear housing 314. In this embodiment, the locking member 310, front housing 318 and rear housing 314 preferably comprise a hard plastic, such as a polycarbonate, wherein the front housing has a thin elastic film 328 welded to an upper portion thereof, thereby allowing a user to engage operational features on the equipment enclosed by the front and rear housings 314 and 318.

It should be appreciated that locking members 308 or 310 may be located only on one side of the watertight equipment cover, or a portion thereof. Alternatively, two locking members could be located on opposite sides of the watertight equipment cover. Similarly, locking members may be included on all sides of the watertight equipment cover. Lastly, it is preferred that the outer facing surface of the locking member 308 or 310 contain raised portions to assist a user in gripping and actuating the locking member 308 or 310.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A watertight cover for equipment comprising:
   at least one housing, said housing having at least one sealing mechanism;
   wherein said sealing mechanism is sealably engageable between open and closed positions, and wherein said housing conforms substantially to the contours of said equipment;
   a rotatable mechanism having
      a rotatable shaft sealingly engaged with said cover,
      a roller interface attached to said shaft for conjoint rotation therewith, wherein said roller interface is engageable with a rotatable structure on said equipment;
      a jog dial housing substantially enclosing said rotatable mechanism wherein said jog dial housing is sufficiently flexible to enable the rotatable mechanism to move perpendicular to the axis of rotation of said shaft.

2. The watertight cover according to claim 1, wherein said at least one sealing mechanism comprises a first sealing mechanism and a second sealing mechanism whereby said first sealing mechanism and said second sealing mechanism sealably engage in a pressure fit manner.

3. The watertight equipment cover according to claim 2, wherein said first sealing mechanism comprises a first elastomer, and said second sealing mechanism comprises a second elastomer that is harder than said first elastomer.

4. The watertight cover according to claim 1, wherein said watertight cover further comprises at least one resiliently deformable portion on said housing located proximate an operable feature of said equipment.

5. The watertight equipment cover according to claim 1, wherein said watertight cover further comprises at least one thin portion on said cover located proximate an audio component of said equipment.

6. The watertight equipment cover according to claim 5, wherein said thin portion is concave in shape.

7. The watertight equipment cover according to claim 1, wherein said housing contains a thin elastic sheet attached to an upper surface of said housing.

8. The watertight equipment cover according to claim 1, wherein said rotatable shaft includes an annular recess and an o-ring seated within said annular recess.

9. The watertight equipment cover according to claim 8, wherein said cover includes a bearing seat for engaging said o-ring, thereby creating a dynamic seal between said rotatable shaft and said cover.

10. The watertight equipment cover according to claim 1, wherein said roller interface comprises a soft elastomer.

11. The watertight equipment cover according to claim 1, wherein said roller interface engages said rotatable structure through a friction interface.

12. The watertight equipment cover according to claim 1, wherein said roller interface engages said rotatable structure through a mechanical interface.

13. The watertight equipment cover according to claim 1, wherein said at least one housing comprises a first housing having a first sealing mechanism and a second housing having a second sealing mechanism whereby said first and second sealing mechanisms comprise grooves in said first and second housings, wherein said grooves are sealably engageable with an o-ring disposed there between.

14. The watertight equipment cover according to claim 13, wherein said first housing includes a locking arm, which is attachable to said second housing.

15. The watertight equipment cover according to claim 1, wherein said at least one housing comprises a first housing and a second housing wherein said second housing includes a locking member that holds said first and second housings together.

16. The watertight equipment cover according to claim 15, wherein said locking member is hinged.

17. The watertight equipment cover according to claim 16, wherein said locking member includes a spline and said first housing includes a recess, wherein said spline removably engages said recess.

18. The watertight equipment cover according to claim 17, wherein said first and second housings comprise a hard plastic and said first housing includes an elastic film on an upper surface thereof.

19. A watertight cover for equipment comprising at least one housing having at least one sealing mechanism, said sealing mechanism operable between open and closed positions;

at least one sealing flap disposed interiorly of said at least one sealing mechanism, said sealing flap having sealing flap edges, whereby said sealing flap edges are engaged in a watertight manner when said sealing mechanism is in the closed position;

a jog dial assembly tangentially engageable with a rotatable structure on said equipment.

* * * * *